April 10, 1951 G. A. MAY 2,548,387
PULLEY
Filed May 26, 1947

Inventor
George A. May

By Clarence A. O'Brien
and Harvey B. Jacobson
Attorneys

Patented Apr. 10, 1951

2,548,387

UNITED STATES PATENT OFFICE 2,548,387

PULLEY

George A. May, Lebanon, Pa.

Application May 26, 1947, Serial No. 750,569

1 Claim. (Cl. 74—230.3)

This invention relates to new and useful improvements in pulleys and the primary object of the present invention is to provide a pulley comprising a plurality of disks between which annular grooves are provided to receive a series of lines, drive belts, or the like.

Another important object of the present invention is to provide a pulley the length of which may be conveniently adjusted to provide the desired number of annular line engaging grooves.

A further object of the present invention is to provide a pulley including novel and improved fastening means for attaching the same to a drive shaft.

A still further aim of the present invention is to provide a pulley device that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
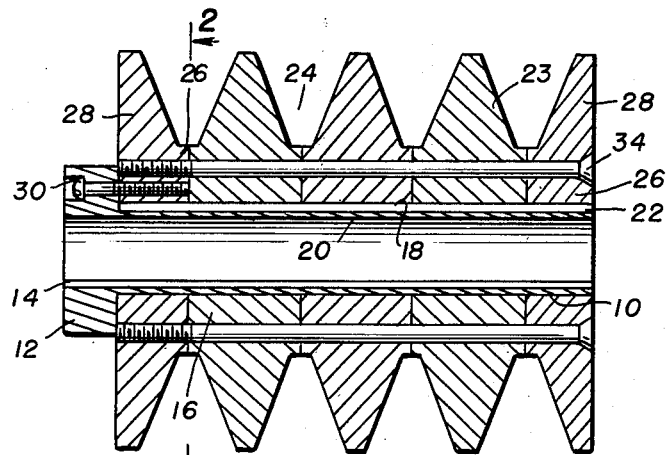
Figure 1 is a longitudinal vertical sectional view of the present invention.
Figures 2, 3:
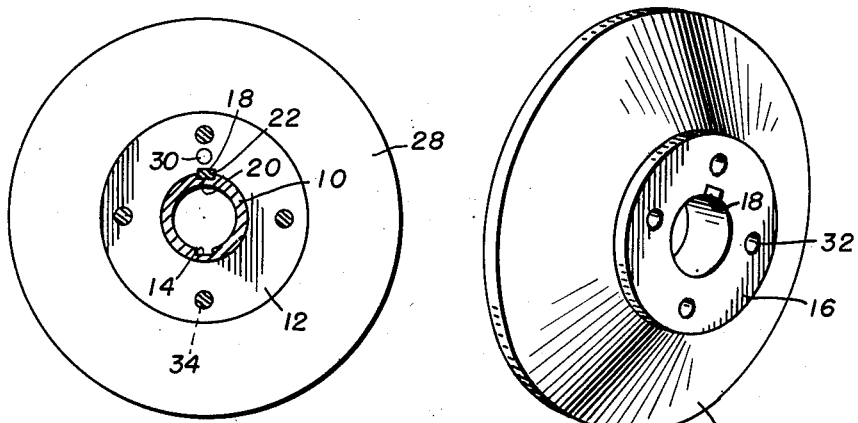
Figure 2 is a side elevational view of the present pulley.
Figure 3 is a perspective view of one of the disk-like members.
Figure 4:
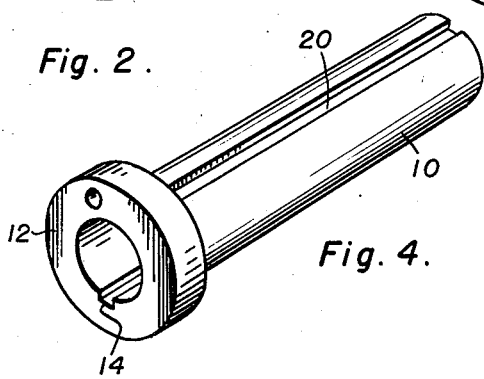
Figure 4 is a perspective view of the drive shaft engaging sleeve.

Referring now to the drawings in detail, wherein for the purpose of illustration, there is disclosed a preferred embodiment of the present invention, the numeral 10 represents a drive shaft engaging sleeve, having a flanged portion 12 at one end.

A longitudinal channel 14 is cut in the inner periphery of said sleeve to provide engaging means for attaching the sleeve to a drive shaft (not shown).

Mounted on the sleeve for rotation therewith, are juxtaposed hubs 16 provided with keyways 18 aligning a keyway 20 in the sleeve and in which is engaged a key 22 for retaining said hubs in aligned position for like rotation with the sleeve. These hubs 16 are integrally formed with disks 23 having their sides beveled to provide annular substantially U-shaped grooves 24 between adjacent disks.

Also mounted on the sleeve intermediate each end, are the hubs 26 of integral end discs 28, having one side beveled to provide a continuous series of similar annular grooves between adjacent discs. One of these end hubs is detachably secured to the flanged portion by counter-sunken bolts or the like 30.

Circumferentially spaced aligned apertures 32 are provided in all of said hubs and receive longitudinally extending fastening means 34, the head portions of which are counter-sunk in one of the end members 28, and the externally threaded end of the fasteners is engageably received in an internally threaded aperture provided in one of the end hubs 28.

As clearly shown in the drawings the key 22 extends through keyways in the end hubs 26 and the flanged portion as well as the intermediate hubs 16.

In practical use of the pulley, the number of grooves between adjacent discs may be increased or decreased by merely removing one of the intermediate hubs and by using shortened length of fastening bolts 34 so that the pulley may be engaged by a selected number of lines.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A pulley comprising an elongated sleeve having an internal longitudinally extending key receiving recess, a flanged portion at one end of said sleeve, a plurality of disks mounted on said sleeve and having their sides beveled to provide annular grooves between adjacent disks, a pair of end disks also mounted on said sleeve and having one of their sides beveled to provide a continuous series of grooves between said disks, a keyway provided in the outer surface of said sleeve, said disks having hubs including keyways aligned with the keyway in said sleeve, a key received in the keyways in said hubs and the keyway in said sleeve, each of said disks having a plurality of circumferentially spaced openings therein spaced parallel to the longitudinal axis of said sleeve, the openings in said end disks being aligned with the openings in said plurality of disks, the openings in one of said end disks being internally threaded, a group of bolts received in said openings and having threaded ends receivably engaging the threaded openings in said one of said end disks, said flanged portion having a bore therein spaced parallel to the longitudinal axis of the sleeve, one of said end disks bearing against the flanged portion and having a threaded aperture in registry with the bore in said flanged portion, and a bolt received in said bore and threaded in the aperture in said one of said end disks.

GEORGE A. MAY.

REFERENCES CITED

The following references are of record in the file of this patent:

UNITED STATES PATENTS

| Number | Name | Date |
|---|---|---|
| 1,031,106 | Camp | July 2, 1912 |
| 1,792,733 | De Wein | Feb. 17, 1931 |
| 2,427,172 | Williams | Sept. 9, 1947 |